United States Patent Office 3,819,602
Patented June 25, 1974

3,819,602
7-CHLORO - 5 - (2-FLUOROPHENYL)-1-(2-HY-DROXYETHYL) - 1,3 - DIHYDRO - 2H-1,4-BENZODIAZEPIN - 2 - ONE AND ESTERS THEREOF
Rodney Ian Fryer, North Caldwell, and Leo Henryk Sternbach, Upper Montclair, N.J., assignors to Hoffmann-La Roche, Inc., Nutley, N.J.
No Drawing. Continuation-in-part of application Ser. No. 806,702, Mar. 12, 1969, which is a continuation-in-part of application Ser. No. 727,356, May 7, 1968, now abandoned. This application Oct. 4, 1971, Ser. No. 186,399
Int. Cl. C07d 53/06
U.S. Cl. 260—239.3 D
17 Claims

ABSTRACT OF THE DISCLOSURE 7-chloro-5-(2-fluorophenyl) - 1 - (2- hydroxyethyl)-1,3-dihydro-2H-1,4-benzodiazepin-2-one, esters and other derivatives thereof. In a broader aspect, the invention relates to certain derivatives of hydroxy-lower alkyl benzodiazepines. The compounds of the present invention induce sleep and hence, are useful as sedative agents.

RELATED CASES

This application is a continuation-in-part of co-pending application Ser. No. 806,702, filed Mar. 12, 1969, and now abandoned, which in turn is a continuation-in-part of application Ser. No. 727,356, filed May 7, 1968, now abandoned.

DETAILED DESCRIPTION OF THE INVENTION

The present invention in one aspect relates to a compound of the formula

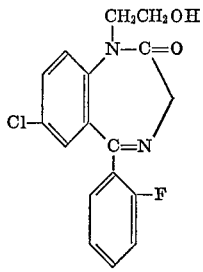

I and acid addition salts thereof with pharmaceutically acceptable acids.

Compounds of the formula I above can be prepared by reacting the sodio derivative of a compound of the formula

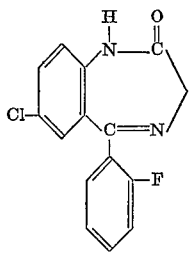

II with a 2-haloethanol, preferably, 2-bromoethanol or 2-chloroethanol. The reaction of a compound of the formula II with a 2-haloethanol is preferably effected in the presence of any suitable inert organic solvent. Preferred among the many inert organic solvents suitable for this purpose are lower alkanols such as methanol, ethers such as diethyl ether and tetrahydrofuran, N,N-dimethylformamide, dimethylsulfoxide and the like.

Compounds of the formula I above can also be prepared by treating a compound of the formula II with ethylene oxide.

The invention further relates to esters of the compound of formula I which are of the formula

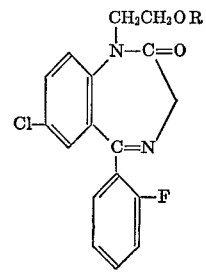

III wherein R is the acyl moiety of any substituted or unsubstituted organic acid, acid anhydride, acyl halide or lower alkyl isocyanate or the acid moiety of any phosphate or sulfate which is capable of combining with the hydroxyl group at the end of the side chain in position-1 of the compound of the formula I above to form the corresponding compound of the formula III bearing an ester grouping in position-1 and salts thereof with pharmaceutically acceptable acids and bases.

Accordingly, R in formula III above (and E in formula IV described more fully hereinafter) can be an organic acyl group such as a lower alkanoyl moiety, a lower alkenoyl moiety, an aroyl moiety, an ar-lower alkanoyl moiety, the monoacyl moiety of a $C_3$–$C_7$ dibasic acid, a carbamate moiety or the acid moiety of a strong inorganic acid, preferably one which has a balance of at least two. The organic acyl moieties may be unsubstituted or substituted with halo, lower alkyl or lower alkoxy.

In a broader aspect, the present invention relates to compounds of the formula

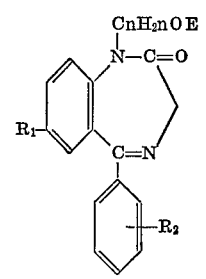

VI wherein $n$ is a whole integer from 2–7, $R_1$ is selected from the group consisting of hydrogen, halogen, nitro and trifluoromethyl, $R_2$ is selected from the group consisting of hydrogen, halogen and nitro and E is selected from the group consisting of halo lower alkanoyl, lower alkoxy lower alkanoyl, aroyl, ar-lower alkanoyl, the monoacyl moiety of a dibasic acid and their salts, the acyl moiety of a lower alkenoic acid, a carbamate moiety, a sulfate moiety and a phosphate moiety.

The invention furthermore relates to the conversion of certain of the compounds of the formula IV into other compound.

In formula IV above $R_1$ is preferably nitro and halogen, most suitably, chlorine. If $R_2$ is other than hydrogen, it is preferably halogen, most suitably, fluorine or chlorine and is situated in the 2-position of the 5-phenyl ring. Of course, most preferred are those esters which are prepared utilizing the 1-hydroxyethyl compounds of the formula I above.

Compounds of the formula IV above can be prepared by esterifying a compound of the formula

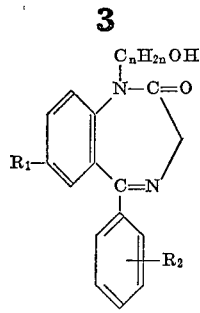

wherein $R_1$, $R_2$ and $n$ are as above.

It should be evident that the radical

may be a straight or branched chain lower alkylene grouping such as ethylene, propylene, ethyl ethylene, pentamethylene and the like.

Illustrative of the groupings encompassed by the character R of formula III or the character E of the formula IV are substituted (e.g. with halo, lower alkyl or lower alkoxy) or unsubstituted lower alkanoyl moieties such as acetyl, propionyl, butyryl, haloacetyl, halopropionyl, e.g. 3-chloro-propionyl, halobutyryl, e.g. 4' - chlorobutyryl, lower alkoxy lower alkanoyl such as methoxyacetyl, ethoxyacetyl and the like.

An aroyl moiety may be represented preferably, by benzoyl or substituted benzoyl such as lower alkyl benzoyl (p-lower alkyl benzoyl), dilower alkoxy benzoyl such as dimethoxy benzoyl, tri-lower alkoxy benzoyl such as trimethoxy benzyl and the like. Aroyl may be further illustrated by the acryl moiety of heterocyclic acids such as picolinic acid, isonicotinic acid, nicotinic acid and the lke which may be unsubstituted or substituted with such groupings as lower alkoxy, halo, lower alkyl and the like. Representative of substituted heterocyclic acids suitable for the purpose of the present invention are lower alkoxy nicotinic acid, e.g. 2-methoxynicotinic acid, halo-nicotinic acid, e.g. 2,4, or 5-bromonicotinic acid, 3-lower alkyl isonicotinic acid and the like. Ar-lower alkanoyl is illustrated by phenyl acetyl. By the expression, a monoacyl moiety of $C_3$–$C_7$ dibasic acid as utilized herein, there is intended the monoacyl moiety of a lower alkanoic dibasic acid such as acid succinyl and the like and the monoacyl moiety of a lower alkenoic dibasic acid such as acid maleyl, acid glutaconoyl and the like. Salts of the latter can be formed with any suitable base such as an alkali metal alkoxide, e.g. sodium methoxide. A carbamate moiety, i.e., —CONH-lower alkyl, can be provided by the utilization of a lower alkyl isocyanate such as methyl isocyanate when esterifying the compound of the formula I or V above. R or E as the phosphate grouping or a sulfate group can be conveniently provided by esterifying with polyphosphoric acid, phosphorus oxychloride, ethylthiophosphate, conc. sulfuric acid and the like.

Therefore, as acid agents suitable of effecting the conversion of compounds of the formula I and V above into the corresponding compounds of the formula III and IV above, there can be efficaciously utilized acetic anhydride, acetyl chloride, propionyl chloride, isonicotinoyl chloride, benzoyl chloride, 4-methyl benzoyl chloride, 3,4,5-trimethoxy benzoyl chloride, succinic anhydride, isonicotinic acid, picolinic acid, maleic anhydride, glutaconic acid anhydride, methyl isocyanate, ethyl isocyanate, strong inorganic acids such as acid phosphates, e.g., polyphosphoric acid, ethylthio phosphate, phosphorus oxychloric acid and acid sulfates such as concentrated sulfuric acid and the like.

As is evident from the above, also suitable as acid agents are organic acids which may be substituted with halogen, lower alkyl or lower alkoxy. Representative of these are halo-acetic acid such as chloroacetic acid, lower alkoxy acetic anhydride such as methoxy acetic anhydride, ethoxy acetic anhydride and the like, 4-lower alkyl benzoyl chloride such as 4-methyl benzoyl chloride, 3,4,5-trimethoxy benzoyl chloride, 2,4 or 5-halonicotinic acid such as 5-bromonicotinic acid, 2,4, or 5-lower alkoxy nicotinic acid such as 2-methoxynicotinic acid and the like.

The esterification with any of the acid agents specified above is conducted in accordance with procedures conventional in the art and well documented in the literature.

For example, with an acid agent such as acid anhydride, e.g. acetic anhydride, or with an acyl halide, e.g. a benzoyl halide such as 3,4,5-trimethoxy benzoyl chloride, or nicotinoyl halide, the reaction can proceed to the desired ester by permitting the reaction medium to stand at room temperature, particularly, if pyridine, or the like is utilized as the solvent medium.

As is evident from the above, the particular reaction conditions for esterifying a compound of the formula I above or of the formula V above are not critical and can be selected by one of ordinary skill in the art depending upon the acid agent utilized, particularly when viewing the esterification desired in the light of the prior art on the subject. By a cursory perusal of the literature, one can readily ascertain a myriad of suitable reagents capable of functioning efficaciously in the formation of the esters of formula II above from the compound of the formula I above or the esters of formula IV above from the compounds of formula V above.

If a terminal free acid group is present in position-1 in a compound of the formula III or IV above (when a dibasic acid or a derivative thereof is utilized as the acyl group providing agent), it can be converted by treatment with a suitable base such as sodium hydroxide or potassium hydroxide, potassium carbonate, alkali metal alkoxides such as sodium methoxide, into the corresponding benzodiazepine of the formula III or IV bearing a COOA grouping at the end of the side chain in position-1 wherein A is the cation of the base utilized. Preferably, A connotes sodium, potassium or the like.

By the term "lower alkyl" as utilized herein, both straight and branched chain $C_1$–$C_7$, preferably $C_1$–$C_4$-hydrocarbon groups are intended such as methyl, ethyl, isobutyl, isopropyl and the like. By the term lower alkoxy, there is similarly intended both straight and branched chain $C_1$–$C_7$, preferably $C_1$–$C_4$, hydrocarbonoxy groups such as methoxy, ethoxy and the like. The term "halogen" or "halide" as found herein is intended to connote all four forms thereof, i.e. chlorine, bromine, fluorine and iodine, unless otherwise specified. The term "lower alkanoyl" connotes a moiety containing 1–7 carbon atoms, either in a branched or straight chain such as methyl carbonyl, ethyl carbonyl, isopropyl carbonyl and the like. The term "lower alkenoic acid" connotes an acid containing both 4–7 carbon atoms, and an ethylenic double bond.

The esterification as is evident from the above, can be conducted in any conventional organic solvent such as dimethylformamide, pyridine, a hydrocarbon such as toluene and the like. However, it is preferred to effect the esterification where possible in the presence of pyridine. Moreover, it has been found that in the case where an acid anhydride is used as the acyl group providing agent, such acid anhydride can itself serve as the reaction medium in addition to being a reaction participant. The reaction is preferably conducted at room temperature but it can also proceed to the desired product efficaciously at above or below room temperature depending upon the acid agent utilized.

Especially preferred esters included within the purview of the present invention are those which evidence particularly high water solubility. Those esters which contain as the R group in formula III above or the E group of Formula IV above nicotinoyl, succinoyl or the phosphate radical have been found to be particularly useful for the purposes of the present invention because of their high solubility in water when in the form of their pharmaceutically acceptable salts. Thus, particularly desirable esters are those which are formed from compounds of the formulae I or V above utilizing as the esterification agent an acid substance containing a nicotinoyl moiety, a succinoyl moiety or a phosphate moiety.

Compounds of the formula IV above wherein E is a halo lower alkanoyl moiety; e.g. a compound of the formula

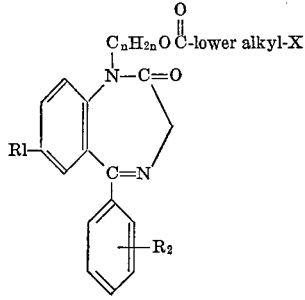

VI wherein $n$, $R_1$ and $R_2$ are as above and X is halogen, preferably, chlorine or bromine can be converted with a primary or secondary amine into the corresponding compounds of the formula

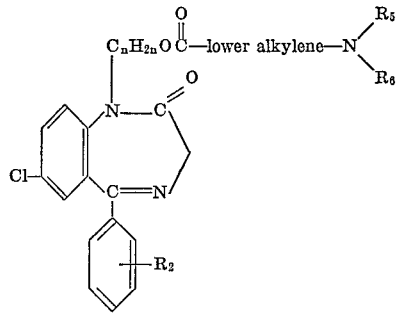

VII wherein $n$, $R_1$ and $R_2$ are as above and $R_5$ and $R_6$ are selected from the group consisting of individually hydrogen and lower alkyl and when taken together with the nitrogen atom represent a heterocyclic moiety containing at the most one additional hetero atom selected from the group consisting of oxygen and nitrogen.

Any primary or secondary amine of the formula

VIII wherein $R_5$ and $R_6$ are as above can be utilized.

The reaction is preferably conducted in an inert organic solvent medium utilizing one or more inert organic solvents such as acetone, methyl ethyl ketone, lower alkanols such as methanol, ethanol and the like, dimethylformamide, benzene, nitromethane and n-methyl-pyrrolidone and the like.

Temperature and pressure are not critical to a successful performance of this process aspect and thus, the reaction can be carried out at or below room temperature and at atmospheric pressure, or at elevated temperatures and/or elevated pressures. However, elevated temperatures, e.g. about the reflux temperature of the reaction mixture, are preferred. If desired, the reaction can proceed in the presence of an alkali halide, e.g. sodium iodide.

Any primary or secondary amine of the formula VIII above can be suitably employed in this process aspect. If a secondary amine is utilized, the two carbon atoms joined to the nitrogen atom of the amine can respectively form a part of a group which exists independently of the other group. Therefore, such carbon atoms can individually comprise a part of a straight or branched chain lower alkyl radical such as methyl, ethyl, propyl, isopropyl or the like. Alternatively, such carbon atoms can comprise part of a divalent radical and such radicals can be combined with each other directly or through the said, at the most, one further hereto atom or to form a group such as pentamethylene, tetramethylene, ethyleneoxythylene and ethyleneazaethylene, which may be substituted or unsubstituted.

Thus, $R_5$ and $R_6$ when taken together with the nitrogen atom and at the most, one further hereto atom selected from the group consisting of oxygen and nitrogen can represent a moiety selected from the group consisting of N - lower alkyl-piperazinyl, N - hydroxyl-lower alkylene piperazinyl, N-lower alkoxy-lower alkylene-piperazinyl, pyrrolidinyl, piperazinyl, morpholinyl and piperidinyl.

Compounds of the formula VI above are novel compounds and hence, constitute a part of the present invention.

Also included within the purview of the present invention are compounds of the formula

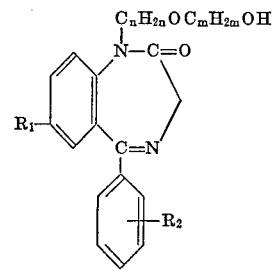

IX wherein $n$, $R_1$, and $R_2$ are as above
and $m$ is a whole integer from 2–7.

Such compounds are prepared by reacting the alcohols of the formula I or V above with a diol. In a preferred aspect the invention is effected utilizing the diol as the solvent medium. Thus, by the convenient expedient of utilizing the diol in excess, there can be provided to the reaction zone, a reaction participant as well as the medium in which the reaction may be effected. Temperature is not a critical aspect of this process aspect and thus the reaction can be effected at room temperature or elevated temperatures. However, it is preferred to utilize elevated temperatures, e.g. from about 70° to about 180°, more preferably from about 130° to about 180°, most suitably at about the reflux temperature of the reaction mixture. Conveniently, a promoter may be present in the reaction system. Illustrative of these are concentrated hydrochloric acid, polyphosphoric acid, thionyl chloride and the like.

The diol utilized in the preparation of the compound of the formula IX above is of the formula HOCmH$_2$mOH wherein $m$ is a whole integer from 2–7. Illustrative of suitable diols are ethylene glycol, 1,3-propylene glycol, 1,4-butylene glycol, 1,3-dihydroxy butane, 1,2-dihydroxy propane and the like.

As is noted above, the compounds of formula I, III, IV, VII, and IX above are useful as sedatives in view of their capability of inducing sleep. Said compounds or their pharmaceutically acceptable salts can be administered with dosage adjusted to individual requirements and fitted to the pharmaceutical exigencies of a situation. For example, they can be administered internally, i.e. enterally or parenterally in the form of tablets, suspensions, solutions, capsules, dragees and the like according to conventional pharmaceutical procedures.

The compounds of the formulae I, III, IV, VII and IX above also form pharmaceutically acceptable salts (depending, of course, on the nature of the substituent in position-1) with both inorganic and organic pharmaceutically acceptable acids and bases such as hydrochloric acid, hydrobromic acid, nitric acid, sulfuric acid, phosphoric acid, citric acid, formic acid, acetic acid, succini aid, methanesulfoni acid, para-toluenesulfonic acid ammonia; amines such as tertiary amines, e.g. triethylamine; alkali metal hydroxides such as sodium and potassium hydroxide; alkali metal alkoxides such as sodium methoxide and the like. Such salts can be formed quite readily by those skilled in the art, with the prior art and the nature of the compound to be placed in salt form, in view.

EXAMPLE 1

A solution of 10 g. (0.0346 m.) of 7-chloro-5-(2-fluorophenyl)-1,3-dihydro-2H-1,4-benzodiazepin-2-one hydrochloride in 25 ml. of N,N-dimethylformamide was treated with 10.6 ml. of a solution ocntaining 0.0415 m. of sodium methoxide in methanol. The solution was stirred at room temperature for 30 minutes and 8.7 g. (0.0692 m.) of 2-bromoethanol was added. The reaction mixture was heated at 80° for 2 hours and then poured into 200 ml. of water. The reaction products were removed by filtration, dissolved in 100 ml. of dichloromethane which was then washed with water (2× 100 ml.), saturated brine, dried over sodium sulfate and evaporated. The residual oil (10.5 g.) was crystallized from ether and the ether medium was filtered to give a first crop of the desired product. Additional product is obtained by evaporating the mother liquors, dissolving in benzene and filtering over 200 g. of silica. The silica was eluted with ether until all impurities had been removed and 7-chloro-5-(2-fluorophenyl)-1-(2-hydroxyethyl)-1,3-dihydro-2H-1,4-benzodiazepin-2-one was then obtained by using methanol as the eluant.

Removal of the solvent gave the product as an oil. An excess of ethanolic hydrogen chloride was added, followed by ether to precipitate the salt. Three recrystallizations of the salt from a mixture of methanol and ether gave 7-chloro-1-(2-hydroxyethyl)-5-(2-fluorophenyl)-1,3-dihydro - 2H - 1,4-benzodiazepin-2-one hydrochloride as pale yellow prisms, m.p. 194–196° dec.

EXAMPLE 2

A solution of 1 g. (0.00346 m.) of 7chloro-5-(2-fluorophenyl)-3H-1,4-benzodiazepin-2(1H)-one in 15 ml. of dry N,N-dimethylformamide was treated with 0.9 ml. (0.00415 m.) of a 4.69 N solution of sodium methoxide in methanol. The mixture was stirred for 0.5 hour, when a solution of 0.45 g. (0.0105 m.) of ethylene oxide in 5 ml. of dry N,N-dimethylformamide was added. The reaction mixture was stirred at room temperature for 2 hours, and at 60° for 1 hour. Solvent was removed under reduced pressure. In order to facilitate separation of the desired product from the starting material and by-products, the alcohol was converted to the half-ester of a di-basic acid by treatment with 1.5 g. (0.015 m.) of succinic anhydride and 50 ml. of toluene giving the water soluble sodium salt which can be separated and hydrolyzed in situ back to the alcohol. The solution was heated under reflux for 3 hours, then cooled in an ice bath, made basic (pH 9) with ammonium hydroxide and the layers were separated. The aqueous layer was treated with 5 ml. of 3 N sodium hydroxide solution and after 30 minutes, the mixture was first acidified with concentrated hydrocholric acid and then made basic with ammonium hydroxide. The product was extracted into 100 ml. of dichloromethane, which was then washed with 50 ml. of saturated brine, dried over anhydrous sodium sulfate, and evaporated to dryness.

The residual oil was dissolved in 15 ml. of benzene, and filtered through 50 g. of silica gel. The silica gel was eluted with 200 ml. of benzene and then with 250 ml. of ethyl acetate. The ethyl acetate fraction was evaporated to dryness, dissolved in 5 ml. of ethanol and treated with an excess of ethanolic hydrogen chloride. Ether was added and 7 - chloro-1-(2-hydroxyethyl)-5-(2-fluorophenyl)-1,3 - dihydro-2H-1,4-benzodiazepin-2-one hydrochloride was separated by filtration as pale yellow prisms, melting at 195–7° (sealed tube).

EXAMPLE 3

A mixture of 2 g. (0.00604 M) of 7chloro-5-(2-fluorophenyl) - 1(2-hydroxyethyl)-1,3-dihydro-2H-1,4-benzodiazepin-2-one, 20 ml. of acetic anhydride and 3 g. of potassim acetate was allowed to stand at room temperature for 16 hours, and was then poured into ice. The solution was made basic with saturated potassium carbonate solution and extracted with 2× 100 ml. of dichloromethane. The organic layers were combined, washed with saturated brine, died over anhydrous sodium sulfate and evaporated to dryness. The product was crystallized from ether and then recrystallized from a mixture of dichloromethane and hexane to give 1 - (2-acetoxyethyl)-7-chloro-5-(2-fluorophenyl) - 1,3-dihydro-H-1,4-benzodiazepin-2-one as white prisms, melting at 103–5°.

EXAMPLE 4

A solution of 5 g. (0.0151 M) of 7-chloro-5-(2-fluorophenyl)-1-(2-hydroxyethyl) - 1,3 - dihydro-2H-1,4-benzodiazepin-2-one in 60 ml. of dry toluene was treated with 2.95 g. (0.0302 M) of maleic anhydride and the resulting mixture was refluxed with stirring for 5 hours. The reaction mixture was cooled and poured into 40 ml. of ether and 100 ml. of dilute ammonium hydroxide. The layers were separated and the basic layer was acidified with acetic acid. The crude product was extracted with 2× 100 ml. of dichloromethane and evaporated to dryness. The residual oil was dissolved in 100 ml. of dichloromethane which was washed with 2× 100 ml. of water, 100 ml. of saturated brine, dried over anhydrous sodium sulfate and evaporated to dryness.

The product was crystallized from isopropanol and then recrystallized twice from a mixture of dichloromethane and hexane to give 2-[7-chloro-5-(2-fluorophenyl)-2,3-dihydro-2-oxo-1H, - 1,4 - benzodiazepin-1-yl]ethyl maleate as pale yellow prisms, melting at 153–7°.

EXAMPLE 5

A solution of 1.6 g. (0.00371 M) of crude 2-[7-chloro-5-(2-fluorophenyl)-2,3-dihydro - 2 - oxo-1H-1,4-benzodiazepin-1-yl]ethyl maleate in 10 ml. of methanol was treated with 0.7 ml. (0.00328 M) of 4.69 N sodium methoxide in methanol and the solution was evaporated to dryness. The residual oil was triturated with ether and the residue was crystallized from a mixture of ethanol and ether. Recrystallization from a mixture of methanol and ether gave 2-[7-chloro-5-(2-fluorophenyl)-2,3-dihydro-2-oxo-1H-1,4-benzodiazepin1-yl]ethyl maleate sodium salt as pale yellow prisms, melting at 143–7°. It was found that this sample retained methanol at 100°, but on recrystallization from a mixture of methanol and acetone, the product was obtained methanol free as pale yellow prisms, melting at 220–2°.

EXAMPLE 6

A solution of 4 g. (0.0121 M) of 7-chloro-5-(2-fluorophenyl)-1(2-hydroxyethyl) - 1,3 - dihydro-2H-1,4-benzodiazepin-2-one in 40 ml. of dry pyridine was treated with 8.2 g. (0.0362 M) of 3,4,5-trimethoxybenzoyl chloride, and the mixture was allowed to stand at room temperature for 16 hours. Solvent was removed by distillation and the residue was dissolved in 100 ml. of dichloromethane. The solution was washed with 100 ml. of 5 percent potassium carbonate solution, 50 ml. of saturated brine, dried over anhydrous sodium sulfate and evaporated to dryness. Recrystallization of the residue from methanol and then from a mixture of dichloromethane and hexane gave 2-[7-chloro-5-(2-fluorophenyl)-2,3-dihydro - 2 - oxo-1H-1,4-benzodiazepin-1-yl]ethyl 3,4,5 - trimethoxybenzoate as white prisms, melting at 161–3°.

EXAMPLE 7

A solution of 4 g. (0.012 M) of 7-chloro-5-(2-fluorophenyl)-1-(2-hydroxyethyl)-1,3-dihydro - 2H - 1,4-benzodiazepin-2-one in 15 ml. of dry pyridine was treated with 20 ml. of methyl isocyanate and the reaction mixture was warmed on the steam bath for 2 hours. Solvents were removed under reduced pressure and the residue was dissolved in 50 ml. of dichloromethane. The solution was washed with 50 ml. of dilute ammonium hydroxide, 25 ml. of saturated brine, dried over anhydrous sodium sulfate and evaporated to dryness giving N-methyl-2-[7-chloro-5-(2-fluorophenyl)-2,3-dihydro - 2 - oxo-1H-1,4-benzodiazepin-1-yl]ethyl carbamate as an oil.

The resulting oil was dissolved in 10 ml. of ethanol, and an excess of ethanolic hydrogen chloride was added. The solution was evaporated to dryness and the residue was crystallized first from a mixture of isopropanol and ether, and then from a mixture of methanol and ether to give the hydrochloride as pale yellow prisms, melting at 175–80° in a sealed tube.

EXAMPLE 8

In a 2-liter flask equipped with a thermometer, stirrer, reflux condenser, drying tube, nitrogen inlet tube, and a dropping funnel was added 100 g. (0.346 M) of 7-chloro-1-(2-hydroxyethyl)-5-(2-fluorophenyl) - 1,3 - dihydro-2H-1,4-benzodiazepin-2-one hydrochloride and 400 ml. of dry N,N-dimethylformamide. The solution was stirred under a slow stream of nitrogen and 33.2 g. (0.692 M) of a 50 percent dispersion of sodium hydride in mineral oil was added. After 30 minutes the solution was cooled in an ice bath to 5° C., and 130 g. (1.04 M) of 2-bromoethanol in 100 ml. of dry N,N-dimethylformamide was added dropwise over a 20 minute period. The nitrogen was turned off, and the reaction was heated to 100° C. for 5 hours, and then it was rinsed into a 3 liter flask with benzene and distilled to dryness under reduced pressure. The so-obtained residue which contained 7-chloro-5-(2-fluorophenyl)-1-(2-hydroxyethyl) - 1,3 - dihydro-2H-1,4-benzodiazepin-2-one was transferred to a 3-liter 3-necked flask with 750 ml. of benzene, when 100 ml. (0.719 M) of triethylamine and 100 g. (1.0 M) of succinic anhydride were added, and the reaction was stirred for 16 hours at room temperature. The reaction was rinsed into a 3-liter flask with benzene, and evaporated to dryness under vacuum. The dark oil was dissolved in 750 ml. of benzene which was then treated with 450 ml. of water with shaking or stirring, and then with a mixture of 550 ml. of ice and water to bring the temperature down to approximately 10° C. The solution was made basic (about pH 8.5) with 175 ml. of a 50 percent (w./v.) potassium carbonate solution with stirring to avoid foaming over. After transferring to a separatory funnel the layers were separated, and the water layer was extracted with 3 × 600 ml. of benzene. The benzene solutions were combined and washed with 200 ml. of a saturated brine solution, dried over anhydrous sodium sulfate, and evaporated to dryness under vacuum to give 13.5 g. of an oil. Recrystallization from methanol gave 5.0 g. of starting material melting at 200–205° C. To the aqueous layer which contains the potassium salt of 2-[7-chloro-5-(2-fluorophenyl) - 2,3 - dihydro-2-oxo-1H-,1,4-benzodiazepin-1-yl]ethylsuccinate was added 220 ml. of 10 N sodium hydroxide solution, and after 4 hours the solution was extracted with 750 ml. of dichloromethane and then with 500 ml. of dichloromethane. The organic layers were combined, washed with 200 ml. of a saturated brine solution, dried over anhydrous sodium sulfate and evaporated to dryness under vacuum to give 111 g. (0.334 M) of 7-chloro-1-(2-hydroxyethyl)-5-(2-fluorophenyl)-1,3-dihydro-2H-1,4-benzodiazepin-2-one as an oil.

EXAMPLE 9

A solution of 5 g. (0.0151 M) of 7-chloro - 1 - (2-hydroxyethyl)-5-(2-fluorophenyl) - 1,3 - dihydro - 2H - 1,4-benzodiazepin-2-one hydrochloride in 60 ml. of pyridine was treated with 8 g. (0.044 M) of nicotinoyl chloride hydrochloride, and the solution was heated on the steam bath, with stirring, for 2 hours. Pyridine was removed under vacuum. The residue was dissolved in 100 ml. of dichloromethane, washed with 10 percent potassium carbonate solution (2 × 75 ml.), 75 ml. of a saturated brine solution, dried over anhydrous sodium sulfate and evaporated to dryness.

The oil was crystallized from ether, and then recrystallized from methanol to give 1 - (2 - nicotinoyloxyethyl)-7-chloro-5-(2-fluorophenyl)-1,3-dihydro-2H - 1,4 - benzodiazepin-2-one as white prisms, melting at 138–40°.

EXAMPLE 10

A solution of 0.5 g. (0.00151 M) of 7-chloro - 5 - (2-fluorophenyl)-1-(2-hydroxyethyl) - 1,3 - dihydro-2H-1,4-benzodiazepin-2-one in 15 ml. of ethylene glycol was treated with 2 drops of concentrated sulfuric acid. The reaction mixture was heated at 160° for 4 hours with stirring, then it was cooled, poured into 100 ml. of ice water, and filtered to remove tarry material. The filtrates were extracted with 100 ml. of dichloromethane, which was then washed with 100 ml. of water, dried over anhydrous sodium sulfate and evaporated to dryness, yielding 7-chloro-5-(2-fluorophenyl)-1,3-dihydro-1-[2-(2 - hydroxyethyl) - oxyethyl]-2H-1,4-benzodiazepin-2-one. The residue was dissolved in 10 ml. of ethanol, and 1 ml. of 7.8 N ethanolic hydrogen chloride was added and the solution was evaporated to dryness. The 7-chloro-5-(2-fluorophenyl)-1,3-dihydro-1-[2-(2 - hydroxyethyl)oxyethyl]-2H-1,4-benzodiazepin-2-one hydrochloride was crystallized from a mixture of ethanol and ether, and recrystallized from a mixture of methanol and ether to give the product as pale yellow prisms, m.p. 180–185° decomp. (sealed tube).

EXAMPLE 11

A solution of 10 g. (0.03 M) of 7-chloro-5-(2-fluorophenyl)-1-(2-hydroxyethyl)-1,3-dihydro-2H - 1,4 - benzodiazepin-2-one in 100 ml. of benzene was treated with 4 g. of succinic anhydride and 4 ml. of triethylamine. After 18 hours at room temperature, solvents were removed under reduced pressure. The residue was dissolved in 100 ml. of dilute potassium carbonate solution, washed with 100 ml. of ether and the aqueous layer was acidified with acetic acid. The liquid was decanted and the residual oil was dissolved in 100 ml. of dichloromethane. The solution was washed with 100 ml. of water, dried over anhydrous sodium sulfate and evaporated to dryness. 2-[7-chloro-5-(2-fluorophenyl)-2,3-dihydro-2-oxo - 1H - 1,4-benzodiazepin - 1 - yl] - ethyl succinate crystallized from ether. Upon recrystallization from a mixture of methanol and ether, the product was obtained as white prisms, m.p. 152–156°.

EXAMPLE 12

A solution of 15 g. (0.045 M) of 7-chloro-5-(2-fluorophenyl)-1-(2-hydroxyethyl)-1,3-dihydro-2H - 1,4 - benzodiazepin-2-one in 200 ml. of xylene was treated with 12.8 g. (0.135 M) of chloroacetic acid and the solution was heated under reflux for 4 hours using a Dean-Stark trap. The reaction mixture was cooled, washed with 10% potassium carbonate solution (3× 75 ml.), water (3× 75 ml.), dried over anhydrous sodium sulfate, and evaporated to dryness. The residue was dissolved in dichloromethane (50 ml.), filtered over 100 g. of Florisil, using 500 ml. of ether as the eluant. The solvent was evaporated and the residue was recrystallized twice from a mixture of dichloromethane and petroleum ether to give 7-chloro-1-(2-chloroacetoxyethyl)-5-(2-fluorophenyl) - 1,3 - dihydro-2H-1,4-benzodiazepin-2-one as white prisms, m.p. 135–137°.

EXAMPLE 13

A solution of 3.0 g. (0.00733 M) of 7-chloro - 1 - (2-chloroacetoxyethyl)-5-(2-fluorophenyl) - 1,3 - dihydro-2H-1,4-benzodiazepin - 2 - one in 25 ml. of benzene was treated with 5 ml. of diethylamine, and the solution was heated under reflux for 12 hours. Solvent was removed under reduced pressure and the residue was triturated with a mixture of ether and petroleum ether. The precipitate was recrystallized from a mixture of dichloromethane, ether and petroleum ether to give 7-chloro-1-(2-diethylaminoacetoxyethyl)-5-(2-fluorophenyl)-1,3-dihydro - 2H-1,4-benzodiazepin-2-one as white prisms, m.p. 84.5–88°.

EXAMPLE 14

A solution of 15 g. (0.045 M) of 7-chloro-5-(2-fluorophenyl)-1-(2-hydroxyethyl)-1,3-dihydro-2H - 1,4 - benzodiazepin-2-one in 170 ml. of xylene was treated with 11.1 g. (0.09 M) of isonicotinic acid, and the solution was heated under reflux for 36 hours using a Dean-Stark trap. The reaction mixture was cooled, washed with 100 ml. of 10% potassium carbonate solution, and then with 100 ml. of water. The xylene solution was extracted with 1 N hydrochloric acid (2× 75 ml.). The acid layers were combined, washed with 100 ml. of ether, and then made basic with ammonium hydroxide. The product was extracted into 100 ml. of dichloromethane, which was then washed with 50 ml. of saturated brine, dried over anhydrous sodium sulfate and evaporated to dryness. The oil was crystallized from ether and recrystallized from a mixture of dichloromethane and petroleum ether to give 7-chloro-5-(2-fluorophenyl)-1-(2-isonicotinoyloxyethyl) - 1,3 - dihydro-2H-1,4-benzodiazepin - 2 - one as white plates, m.p. 138–142°.

EXAMPLE 15

A solution of 5 g. (0.0122 M) of 7-chloro-1-(2-chloroacetoxyethyl) - 5 - (2-fluorophenyl)-1,3-dihydro-2H-1,4-benzodiazepin-2-one in 75 ml. of benzene was treated with 1.8 g. (0.0305 M) of propylamine, and heated under reflux for 20 hours. The mixture was cooled, treated with 75 ml. of water and enough hydrochloric acid to adjust the pH to 5. The acid layer was separated, made basic with ammonium hydroxide, and extracted with 100 ml. of dichloromethane. The organic layer was washed with saturated brine, dried over anhydrous sodium sulfate and evaporated to dryness yielding 7-chloro-5-(2-fluorophenyl)-1-(2-propylaminoacetoxyethyl) - 1,3 - dihydro-2H-1,4-benzodiazepin-2-one. A solution of 3 g. of the residue in 10 ml. of ethanol was treated with 1 equivalent of ethanolic hydrogen chloride (0.6 ml. of a 7.8 N solution) and the solution was evaporated to dryness. The monohydrochloride was crystallized from isopropanol and recrystallized from a mixture of methanol and ether to give 7-chloro-5-(2-fluorophenyl) - 1 - (2-propylaminoacetoxyethyl) - 1,3 - dihydro-2H-1,4-benzodiazepin-2-one hydrochloride as white prisms, m.p. 219–222° decomp. (sealed tube).

EXAMPLE 16

4 g. (12.0 mmol) of 7-chloro-5-(2-fluorophenyl)-1-(2-hydroxyethyl) - 1,3 - dihydro-2H-1,4-benzodiazepin-2-one is dissolved in 21 ml. of anhydrous pyridine and 150 ml. of dry ether and the solution is cooled to −10°. A second solution of 1.2 ml. of phosphorous oxychloride in 75 ml. of ether is added, from a pressure-equilibrated dropping funnel, over a half-hour period, with stirring. The temperature is kept below 0° for another two hours, and then allowed to rise to ambient. After one additional hour, 300 ml. of ice slush and 150 ml. of ether are added, and after one hour, the layers are separated.

The aqueous portion is concentrated in vacuo at 30° and the pH adjusted downward to 3.2. The organic derivative is adsorbed into 100 ml. of a 30% aqueous suspension of acid-washed NORITE. The liquid phase is removed, and the charcoal is washed with four bed volumes of water adjusted to the mildly acid pH of the original solution. The phosphate is then desorbed with a 1:1 mixture of ethanol-water containing 0.3% concentrate $NH_3$ in 5 × 100 ml. batches.

The combined filtrates are concentrated to a highly hygroscopic oil, reconcentrated once with absolute ethanol and finally triturated with several batches of ethyl ether. The resultant powder is kept in a vacuum desiccator, yielding 7-chloro-1-(2-hydroxyethyl) - 5 - (2-flu-orophenyl)-1,3-dihydro - 2H - 1,4-benzodiazepin-2-one-o-phosphate diammonium salt.

EXAMPLE 17

A solution containing 4.4 g. (0.0131 M) of 7-chloro-5-(2-fluorophenyl) - 1 - (2 - hydroxyethyl)-1,3-dihydro-2H-1,4-benzodiazepin-2-one and 2.0 g. (0.0131 M) of 2-methoxynicotinic acid in 100 ml. of xylene was heated under reflux for 58 hours using a Dean-Stark trap. The reaction mixture was cooled and washed with 75 ml. of 1 N hydrochloric acid, which was then extracted with 50 ml. of ether. The ether was combined with the xylene fraction and washed with 100 ml. of dilute ammonium hydroxide, 50 ml. of saturated brine, dried over anhydrous sodium sulfate and distilled to dryness under vacuum giving 7-chloro - 1,3 - dihydro-5-(2-fluorophenyl)-1-(2-methoxynicotinoyloxyethyl) - 2H - 1,4-benzodiazepin-2-one. The oil was dissolved in 100 ml. of benzene and 5 ml. (0.039 M) of a 7.8 N ethanolic hydrogen chloride solution was added and the solution was distilled to dryness under vacuum. The residue was crystallized from a mixture of acetone and ether, and then recrystallized from a mixture of methanol and ether to give 7-chloro-1,3-dihydro-5-(2 - fluorophenyl)-1-(2 - methoxynicotinoyloxyethyl)-2H-1,4-benzodiazepin-2-one dihydrochloride as pale yellow prisms, m.p. 154–158° (sealed tube).

EXAMPLE 18

A solution of 3.3 g. (0.01 M) of 7-chloro-5-(2-fluorophenyl) - 1 - (2-hydroxyethyl)-1,3-dihydro-2H-1,4-benzodiazepin-2-one and 2.0 g. (0.01 M) of 5-bromonicotinic acid in 100 ml. of xylene was heated under reflux for 48 hours using a Dean-Stark trap. The reaction mixture was cooled and washed with 75 ml. of 1 N hydrochloric acid to remove unreacted starting material. The aqueous layer was extracted with 50 ml. of ether which was combined with the xylene solution and washed with 100 ml. of dilute ammonium hydroxide, 50 ml. of saturated brine, dried over anhydrous sodium sulfate and evaporated to dryness under vacuum. The residue was crystallized from ether and recrystallized from a mixture of dichloromethane and hexane to give 7-chloro-1-(5-bromonicotinoyloxyethyl) - 1,3 - dihydro-5-(2-fluorophenyl)-2H-1,4-benzodiazepin-2-one as white prisms, m.p. 140–143°.

EXAMPLE 19

A solution of 10 g. (0.030 M) of 7-chloro-5-(2-fluorophenyl)-1-(2-hydroxyethyl) - 1,3 - dihydro-2H-1,4-benzodiazepin-2-one in 100 ml. of dry benzene was treated with 6 ml. (0.0428 M) of triethylamine, and 6.3 g. (0.033 M) of ethoxyacetic anhydride. After 18 hours at room temperature, the solvents were removed under vacuum and the residue was dissolved in 100 ml. of dichloromethane which was washed with 100 ml. of 10% $K_2CO_3$ solution, 50 ml. of saturated brine, dried over anhydrous sodium sulfate and evaporated to dryness yielding 7-chloro-1,3-dihydro - 1 - (2 - ethoxyacetoxyethyl)-5-(2-fluorophenyl)-2H-1,4-benzodiazepin-2-one as an oil. The oil was dissolved in 100 ml. of benzene which was treated with 6 ml. (0.0468 M) of a solution of 7.8 N ethanolic hydrogen chloride, and then evaporated to dryness. The residue was recrystallized from a mixture of acetone and ether to give 7-chloro-1,3-dihydro-1-(2 - ethoxyacetoxyethyl) - 5 - (2-fluorophenyl)-2H-1,4-benzodiazepin-2-one hydrochloride as pale yellow prisms, m.p. 154–158° (sealed tube).

EXAMPLE 20

7 - Chloro - 5 - (2-fluorophenyl)-1-(2-hydroxyethyl)-1,3 - dihydro - 2H - 1,4-benzodiazepin-2-one, 4 g. (12.0 mMol) is dissolved in 21 ml. of anhydrous pyridine and 150 ml. of dry ether and the solution is cooled to −10°. A second solution of 1.2 ml. of phosphorous oxychloride in 75 ml. of ether is added, from a pressure-equilibrated dropping funnel, over a half-hour period, with stirring. The temperature is kept below 0° for another two hours, and then allowed to rise to ambient. After one additional hour, 300 ml. of ice slush and 150 ml. of ether are added, and after one hour, the layers are separated.

The aqueous portion is concentrated in vacuo at 30° (careful! avoid splashing) and the pH adjusted downward at 3.2. The organic derivative is adsorbed into 100 ml. of a 30 percent aqueous suspension of acid-washed NORITE. The liquid phase is removed, and the charcoal is washed with four bed volumes of water adjusted to the mildly acid pH of the original solution. The phosphate is then desorbed with 1:1 mixture of ethanol-water containing 0.3 percent concentrated $NH_3$ in 5× 100 ml. batches. The combined filtrates are concentrated to highly hygroscopic oil, reconcentrated once with absolute ethanol and finally triturated with several batches of ethyl ether. The resultant powder is kept in a vacuum desiccator yielding 7-chloro - 1 - (2 - hydroxyethyl) - 5 - (2-fluorophenyl)-1,3-dihydro - 2H - 1,4 - benzodiazepin - 2 - one O-phosphoric acid diammonium salt (MW 447.1)—2.7 mM.

EXAMPLE 21

A solution of 0.332 g. (1 mM) of 7-chloro-5-(2-fluorophenyl) - 1 - (2 - hydroxyethyl) - 1,3 - dihydro-2H-1,4-benzodiazepin-2-one in 6 ml. of dry pyridine was mixed with 0.795 g. (5 mM.) of $SO_3$-pyridine adduct and the suspension shaken at room temperature overnight. The residue left after removal of the solvent in vacuo at 25° C. was dissolved in water, and adjusted to pH 7 with saturated $Ba(OH)_2$ solution. An equal volume of ethanol was added, and the $BaSO_4$ removed by centrifugation. The supernatant and a 50 percent ethanol wash of the precipitate were combined, concentrated in vacuo to dryness, and the residue dissolved in 95 percent ethanol. After centrifugation to remove some insoluble material, the ethanol solution was evaporated and the residue dissolved in 1 ml. of water. Chromatography was carried out on a DEAE-cellulose (bicarbonate) column 2× 20 cm., using a linear gradient of $H_2O$–0.3 M pH 7 TEABIC* of 1500 ml. total volume. Fractions 161–235 contained 7 - chloro - 5 - (2-fluorophenyl) - 2,3 - dihydro - 2 - oxo - 1H-1,4-benzodiazepin - 1 - ethyl hydrogen sulfate triethylamine salt, and fractions 201–235 were evaporated to give the product as a yellow glass, with a $\lambda_{max.}^{EtOH} = 311$ m$\mu$;

$E_{311} = 400$ O.D., corresponding to ~0.18 mM. (based on $E_{2200}$).

EXAMPLE 22

A quantity of 300 mg. (2 mMoles) of dilithium S-(ethyl) phosphorothioate was converted to its pyridinium salt by passage over Dowex-50 (pyridinium). The pyridinium salt was rendered anhydrous with frequent high vacuum concentration, using anhydrous pyridine. To the dry residue was added 332 mg. (1 mMole) of 7-chloro-5-(2 - fluorophenyl) - 1 - (2 - hydroxyethyl) - 1,3 - dihydro-2H-1,4-benzodiazepin-2-one, 800 mg. (4 mM.) of dicyclohexylcarbodiimide and 10 ml. of anhydrous pyridine. The reaction mixture was shaken in the dark for 24 hours. $H_2O$, 3 ml., was added and the reaction left standing overnight. The dicyclohexylurea was filtered and washed with aqueous pyridine. The filtrate was concentrated to remove the pyridine and the residue dissolved in water (2 ml.) and the pH adjusted to 8 with dilute ammonium hydroxide. The solution was applied to a 4×40 cm. column of DEAE-cellulose DE-23 (bicarbonate form) and the column washed with a linear gradient consisting of 2 liters of triethylammonium bicarbonate in the reservoir (0.2 M., pH 7.2) and 2 liters of water in the mixing vessel. Fractions of 20 ml. were collected at a flow rate of 3 ml./min.

Fraction 100–220 contained the product as shown by paper chromatography (70 parts acetonitrile, 30 parts 0.1 N ammonium chloride pH 9, ascending). The fractions were pooled and concentrated to an oily residue and dissolved in 10 ml. of water. A solution containing 1.2 g. $I_2$ in acetone (10 ml.) was added and the mixture left standing for 3 hours. The solution was extracted with 6× 30 ml. of ether and the aqueous portion concentrated and the pH adjusted to 3.2. Activated Norite (70 ml. of a 30 percent suspension) was added and the mixture left at 0° for 15 minutes. The charcoal was filtered and washed with water. The product was desorbed twice with a mixture of 100 ml. of water, 100 ml. of ethanol and 0.6 ml. concentrated $NH_3$. The filtrate was concentrated and reconcentrated with ethanol to an oil. 7 - Chloro - 1 - (2-hydroxyethyl) - 5 - (2 - fluorophenyl)-1,3-dihydro-2H-1,4-benzodiazepin-2-one O-phophoric acid diammonium salt as a yellowish powder was obtained upon triturating with ether.

EXAMPLE 23

A capsule dosage form containing the following ingredients:

| | Per capsule, mg. |
|---|---|
| 7 - Chloro - 5 - (2-fluorophenyl)-1-(2-hydroxyethyl)-1,3 - dihydro - 2H - 1,4-benzodiazepin-2-one | 10 |
| Lactose, U.S.P. | 165 |
| Corn starch, U.S.P. | 30 |
| Talc, U.S.P. | 5 |
| Total weight | 210 | was prepared as follows: 7 - Chloro - 5 - (2-fluorophenyl) - 1 - (2 - hydroxyethyl) - 1,3 - dihydro - 2H - 1,4 - benzodiazepin-2-one, the lactose and the corn starch were mixed in a suitable mixer. The mixture was further blended by passing through a Fitzpatrick Comminuting Machine with a No. 1A screen with knives forward. The blended powder was returned to the mixer, the talc added and blended thoroughly. The mixture was filled into No. 4 hard shell gelatin capsules on a Parke Davis capsulating machine.

EXAMPLE 24

A parenteral dosage formulation containing the following ingredients:

| | Per cc. |
|---|---|
| 7-chloro-5-(2-fluorophenyl)-1-(2-hydroxyethyl)-1,3-dihydro-2H-1,4-benzodiazepin-2-one mg. | 5.0 |
| Propylene glycol cc. | 0.4 |
| Benzyl alcohol (benzaldehyde free) cc. | 0.015 |
| Ethanol 95 percent, U.S.P. cc. | 0.10 |
| Sodium benzoate mg. | 48.8 |
| Benzoic acid mg. | 1.2 |
| Water for injection, q.s. cc. | 1.0 | was prepared (for 10,000 cc.'s) as follows: 50 grams of 7-chloro-5-(2-fluorophenyl) - 1 - (2-hydroxyethyl)-1,3-dihydro-2H-1,4-benzodiazepin-2-one were dissolved in 150 cc. of benzyl alcohol; 4,000 cc. of propylene glycol and 1,000 cc. of ethanol were added. 12 grams of benzoic acid were dissolved in the above. 48.8 grams of sodium benzoate dissolved in 3,000 cc. of Water for Injection were added. The solution was brought up to final volume of 10,000 cc. with Water for Injection. The solution was filtered through an 02 Selas candle, filled into suitable size ampuls, gassed with $N_2$ and sealed. It was then autoclaved at 10 p.s.i. for 30 minutes.

EXAMPLE 25

A tablet dosage formulation containing the following ingredients:

| | Per tablet, mg. |
|---|---|
| 7-chloro-5-(2-fluorophenyl)-1-(2-hydroxyethyl)-1,3-dihydro-2H-1,4-benzodiazepin-2-one | 25.00 |
| Dicalcium phosphate dihydrate, unmilled | 175.00 |
| Corn starch | 24.00 |
| Magnesium stearate | 1.00 |
| Total weight | 225.00 |

*Triethylammoniumbicarbonate.

were prepared as follows: 7-chloro-5-(2-fluorophenyl)-1-(2-hydroxyethyl) - 1,3 - dihydro-2H-1,4-benzodiazepin-2-one and corn starch were mixed together and passed through a No. 00 screen in Model "J" Fitzmill with hammers forward. This premix was then mixed with dicalcium phosphate and one-half of the magnesium stearate, passed through a No. 1A screen in Model "J" Fitzmill with knives forward, and slugged. The slugs were passed through a No. 2A plate in a Model "D" Fitzmill at slow speed with knives forward, and the remaining magnesium stearate was added. The mixture was mixed and compressed.

EXAMPLE 26

A tablet formulation containing the following ingredients:

| | Per tablet, mg. |
|---|---|
| 2-[7-chloro-5-(2-fluorophenyl)-2,3-dihydro-2-oxo-1H-1,4-benzodiazepin-1-yl]ethyl succinate | 25.00 |
| Dicalcium phosphate dihydrate, unmilled | 175.00 |
| Corn starch | 24.00 |
| Magnesium stearate | 1.00 |
| Total weight | 225.00 | was prepared as follows:
1. 2-[7-chloro - 5 - (2-fluorophenyl) - 2,3-dihydro-2-oxo-1H-1,4-benzodiazepin-1-yl]ethyl succinate and corn starch were mixed together and passed through a No. 00 screen in Model "J" Fitzmill with hammers forward.
2. This premix was then mixed with dicalcium phosphate and one-half of the magnesium stearate, passed through a No. 1A screen in Model "J" Fitzmill with knives forward, and slugged.
3. The slugs were passed through a No. 2A plate in a Model "D" Fitzmill at slow speed with knives forward, and the remaining magnesium stearate was added.
4. The mixture was mixed and compressed.

EXAMPLE 27

A capsule formulation containing the following ingredients:

| | Per capsule, mg. |
|---|---|
| 2-[7-chloro-5-(2-fluorophenyl)-2,3-dihydro-2-oxo-1H-1,4-benzodiazepin-1-yl]ethyl succinate | 10 |
| Lactose, U.S.P. | 165 |
| Corn starch, U.S.P. | 30 |
| Talc, U.S.P. | 5 |
| Total weight | 210 | was prepared as follows:
1. 2-[7-chloro - 5 - (2-fluorophenyl) - 2,3 - dihydro-2-oxo-1H-1,4-benzodiazepin-1-yl]ethyl succinate, lactose and corn starch were mixed in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into No. 4 hard shell gelatin capsules on a Parke Davis capsulating machine. (Any similar type capsulating machine may be used).

EXAMPLE 28

A parenteral formulation containing the following ingredients:

| | Per cc. |
|---|---|
| 2 - [7 - chloro - 5-(2-fluorophenyl)-2,3-dihydro-2-oxo-1H-1,4-benzodiazepin-yl]ethyl succinate mg | 10.2 |
| Diethanolamine mg | 2.904 |
| Benzyl alcohol ml | 0.01 |
| Water for injection, q.s. ml | 1.00 |
| Hydrochloric acid 1 N, q.s. to pH 7.3. | | were prepared (for 10 liters) as follows:

1. The 29.04 grams of diethanolamine and 100 ml. of benzyl alcohol were dissolved in 8 liters of water for injection. The 102 grams of 2-[7-chloro-5-(2-fluorophenyl)-2,3-dihydro-2-oxo-1H-1,4-benzodiazepin-1-yl]ethyl succinate were added and the mixture was stirred until the drug was completely dissolved.
2. A 1 N preparation of HCl was added slowly, dropwise, with constant stirring to a pH of 7.3. The solution was brought up to final volume of 10 liters with water for injection.
3. The solution was filtered through an 02 Selas candle, filled into suitable size amber ampuls, gassed with $N_2$ and sealed. The sealed ampuls were then autoclaved at 10 p.s.i. for 30 minutes.

EXAMPLE 29

In analgous manner to the procedures set forth in Examples 23 through 25 above, capsule, parenteral and tablet formulations can be prepared wherein 1-(2-acetoxyethyl) - 7 - chloro-5-(2-fluorophenyl)-1,3-dihydro-2H-1,4-benzodiazepin-2-one is used as the active ingredient.

What is claimed is:
1. A compound of the formula

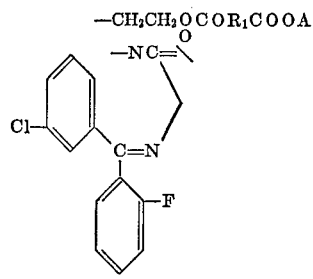

wherein $R_1$ is lower alkylene or lower alkenylene and A is selected from the group consisting of hydrogen and an alkali metal.

2. A compound as defined in claim 1 of the formula 2 - [7 - chloro-5(2-fluorophenyl)-2,3-dihydro-2-oxo-1H-1,4-benzodiazepin-1-yl]ethyl maleate.

3. 2 - [7 - chloro-5-(2-fluorophenyl)-2,3-dihydro-2-oxo-1H-1,4-benzodiazepin-1-yl]ethyl maleate sodium salt.

4. A compound of the formula

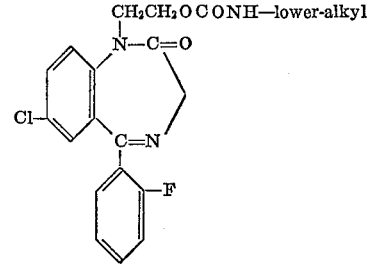

5. A compound as defined in claim 4 of the formula N - methyl - 2-[7-chloro-5-(2-fluorophenyl)-2,3-dihydro-2-oxo-1H-1,4-benzodiazepin-1-yl]ethyl carbamate.

6. A compound of the formula

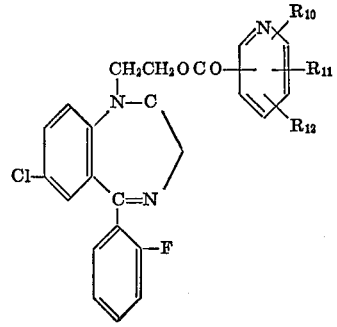

wherein $R_{10}$, $R_{11}$, and $R_{12}$ are selected from the group consisting of hydrogen, lower alkoxy, methyl and halogen.

7. A compound as defined in claim 6 of the formulua 1-(2 - nicotinoyloxyethyl)-7-chloro-5-(2-fluorophenyl)-1,3-dihydro-2H-1,4-benzodiazepin-2-one.

8. A compound as defined in claim 6 wherein $R_{11}$ and $R_{12}$ are both hydrogen.

9. A compound as defined in claim 1 of the formula 2 - [7 - chloro-5-(2-fluorophenyl)-2,3-dihydro-2-oxy-1H-1,4-benzodiazepin-1-yl]-ethyl-succinate.

10. A compound of the formula

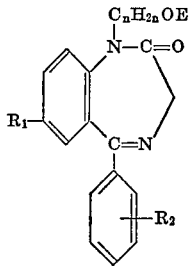

wherein $n$ is a whole integer from 2–7, $R_1$ is selected from the group consisting of hydrogen, halogen, nitro and trifluoromethyl, $R_2$ is selected from the group consisting of hydrogen, halogen and nitro and E is selected from the group consisting of lower alkoxy lower alkanoyl, halo lower alkanoyl, benzoyl, benzoyl substituted with lower alkyl or lower alkoxy, picolinoyl, picolinoyl substituted with lower alkoxy, halogen, or lower alkyl, isonicotinoyl, isonicotinoyl substituted with lower alkoxy, halogen or lower alkyl, nicotinoyl, nicotinoyl substituted with lower alkoxy, halogen or lower alkyl, phenyl-lower alkanoyl or —CONH-lower alkyl
and pharmaceutically acceptable salts thereof.

11. A compound of the formula

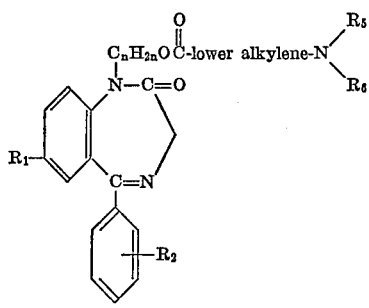

wherein $n$ is a whole integer from 2–7, $R_1$ is selected from the group consisting of hydrogen, halogen, nitro and trifluoromethyl, $R_2$ is selected from the group consisting of hydrogen, halogen and nitro and $R_5$ and $R_6$ are selected from the group consisting of individually hydrogen and lower alkyl and when taken together with the nitrogen atom, represent a N-lower alkyl-piperazinyl, N-hydroxy-lower alkylene piperazinyl, N-lower alkoxy-lower alkylene-piperazinyl, pyrrolidinyl, piperazinyl, morpholinyl and piperidinyl
and pharmaceutically acceptable salts thereof.

12. A compound as in claim 11 of the formula 7-chloro - 5 - (2-fluorophenyl)-1-(2-propylaminoacetoxyethyl)-1,3-dihydro-2H-1,4-benzodiazepin-2-one.

13. A compound as in claim 11 of the formula 7-chloro - 1 - (2-diethylaminoacetoxyethyl)-5-(2-fluorophenyl)-1,3-dihydro-2H-1,4-benzodiazepin-2-one.

14. A compound of the formula

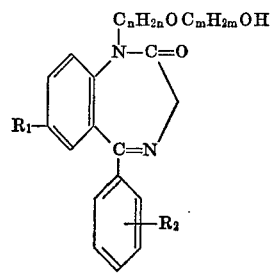

wherein $n$ and $m$ are whole integers from 2–7, $R_1$ is selected from the group consisting of hydrogen, halogen, nitro and trifluoromethyl and $R_2$ is selected from the group consisting of hydrogen, halogen and nitro
and pharmaceutically acceptable salts thereof.

15. A compound as in claim 14 of the formula 7-chloro - 5 - (2-fluorophenyl)-1,3-dihydro-1-[2-hydroxyethyl) oxyethyl]-2H-1,4-benzodiazepin-2-one.

16. A compound of the formula

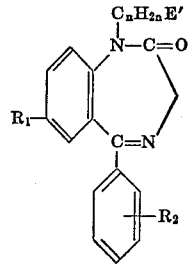

wherein $n$ is a whole integer from 2–7, $R_1$ is selected from the group consisting of hydrogen, halogen, nitro and trifluoromethyl, $R_2$ is selected from the group consisting of hydrogen, halogen and nitro, E' is selected from the group consisting of

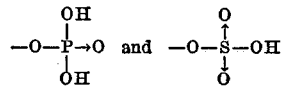

and the pharmaceutically acceptable salts thereof.

17. A compound as in claim 16 of the formula 7-chloro - 1 - (2-hydroxyethyl)-5-(2-fluorophenyl)-1,3-dihydro-2H-1,4-benzodiazepin-2-one o-phosphate.

References Cited

UNITED STATES PATENTS

| | | | |
|---|---|---|---|
| 3,136,815 | 6/1964 | Reeder et al. | 260—239.3 D |
| 3,141,890 | 7/1964 | Reeder et al. | 260—239.3 D |
| 3,391,138 | 7/1968 | Archer et al. | 260—239.3 D |

OTHER REFERENCES

Sternbach et al.: "Some Aspects of Structure-Activity Relationship in Psychotropic Agents of the 1,4-Benzodiazepine Series," a symposium held at the Regional Research Laboratory, Hyderbad, India CSIR, New Dehli, India (1966).

HENRY R. JILES, Primary Examiner

R. T. BOND, Assistant Examiner

U.S. Cl. X.R.

424—244, 266

UNITED STATES PATENT OFFICE
CERTIFICATE OF CORRECTION

Patent No. 3,819,602     Dated  6/25/74

Inventor(s) Rodney Ian Fryer and Leo Henryk Sternbach

It is certified that error appears in the above-identified patent and that said Letters Patent are hereby corrected as shown below:

Column 16, lines 25-30

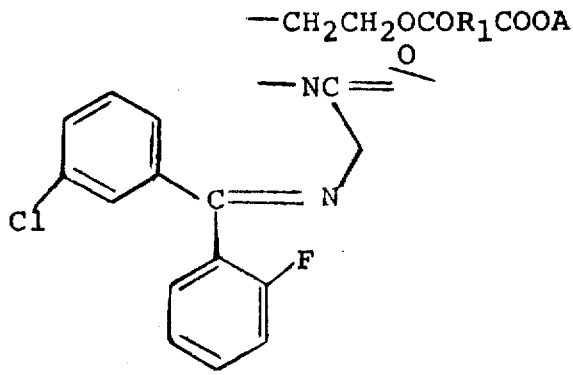

Should be

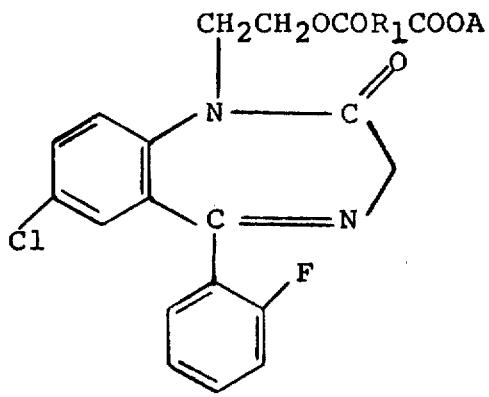

UNITED STATES PATENT OFFICE
CERTIFICATE OF CORRECTION

Patent No. 3,819,602     Dated 6/25/74

Inventor(s) Rodney Ian Fryer and Leo Henryk Sternbach

It is certified that error appears in the above-identified patent and that said Letters Patent are hereby corrected as shown below:

Column 16, lines 65-75

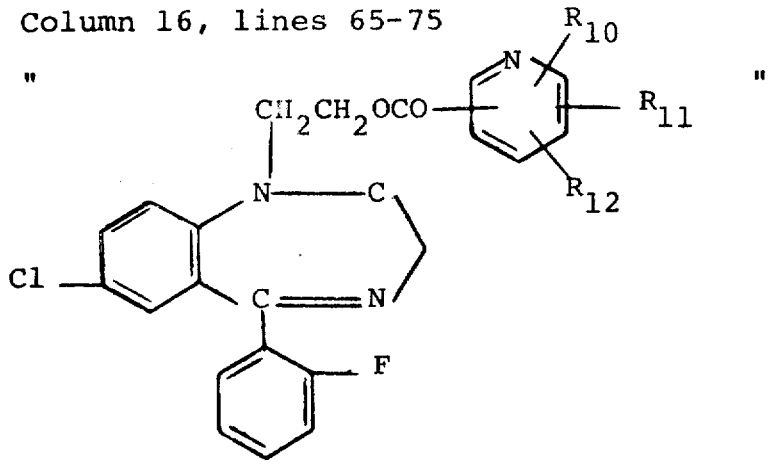

Should be

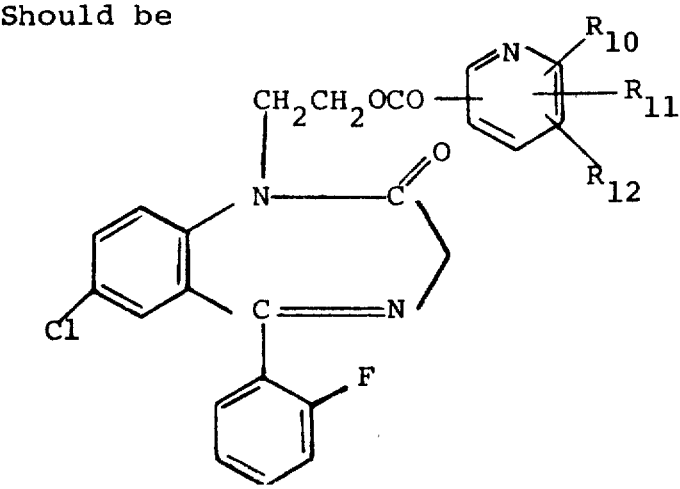

Signed and sealed this 12th day of November 1974.

(SEAL)
Attest:

McCOY M. GIBSON JR.
Attesting Officer

C. MARSHALL DANN
Commissioner of Patents